United States Patent
Nyuugaku

(10) Patent No.: US 11,377,455 B2
(45) Date of Patent: Jul. 5, 2022

(54) PREPARATION OF ORGANOSILICON COMPOUND HAVING (METH)ACRYLOYLOXY GROUP

(71) Applicant: Shin-Etsu Chemical Co., Ltd., Tokyo (JP)

(72) Inventor: Takeshi Nyuugaku, Joetsu (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 0 days.

(21) Appl. No.: 17/077,263

(22) Filed: Oct. 22, 2020

(65) Prior Publication Data

US 2021/0139515 A1   May 13, 2021

(30) Foreign Application Priority Data

Nov. 7, 2019 (JP) .............................. JP2019-202090

(51) Int. Cl.
*C07F 7/14* (2006.01)

(52) U.S. Cl.
CPC ..................... *C07F 7/14* (2013.01)

(58) Field of Classification Search
CPC .............. C07F 7/14; C07F 7/12; C07F 7/20
See application file for complete search history.

(56) References Cited

U.S. PATENT DOCUMENTS

2005/0070729 A1   3/2005 Kiyomori et al.

FOREIGN PATENT DOCUMENTS

| EP | 0 247 501 A2 | 12/1987 |
|---|---|---|
| EP | 0 562 584 A1 | 9/1993 |
| JP | 11-29583 A | 2/1999 |
| WO | WO 2016/005757 A1 | 1/2016 |

OTHER PUBLICATIONS

PubChem (Allyl methacrylate; https://pubchem.ncbi.nlm.nih.gov/compound/Allyl-methacrylate#section=Computed-Properties; downloaded on Aug. 10, 2021).*
Sigma (Chlorodimethylsilane; https://www.sigmaaldrich.com/US/en/product/aldrich/144207; downloaded on Aug. 10, 2021).*
Belyakova et al., "Effect of Catalysis on the Reaction of Allyl Esters with Hydrosilanes," Russian Journal of General Chemistry, vol. 80, No. 4, 2010, pp. 728-733, 6 pages total.
Extended European Search Report for European Application No. 20202783.5, dated Mar. 12, 2021.

* cited by examiner

*Primary Examiner* — Pancham Bakshi
(74) *Attorney, Agent, or Firm* — Birch, Stewart, Kolasch & Birch, LLP

(57) ABSTRACT

A (meth)acryloyloxy-containing organosilicon compound (3) is prepared by simultaneously feeding a hydrohalosilane compound (1) and a (meth)acrylate compound (2) in the presence of a polymerization inhibitor to a reaction system, and effecting hydrosilylation reaction in the presence of a platinum catalyst. The content of (meth)acrylate compound (2) is 0-100 mol % based on the content of organosilicon compound (3) in the reaction system. $R^1$ is a $C_1$-$C_{10}$ monovalent hydrocarbon group, X is halogen, n is 1, 2 or 3, $R^2$ is H or methyl, and $R^3$ is a $C_1$-$C_{18}$ alkylene group.

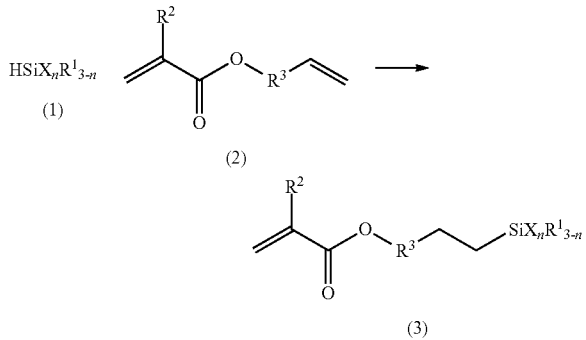

2 Claims, No Drawings

PREPARATION OF ORGANOSILICON COMPOUND HAVING (METH)ACRYLOYLOXY GROUP

CROSS-REFERENCE TO RELATED APPLICATION

This non-provisional application claims priority under 35 U.S.C. § 119(a) on Patent Application No. 2019-202090 filed in Japan on Nov. 7, 2019, the entire contents of which are hereby incorporated by reference.

TECHNICAL FIELD

This invention relates to a method for preparing an organosilicon compound having a (meth)acryloyloxy group.

As used herein, the terminology "(meth)acrylate" is intended to mean acrylate or methacrylate. Similarly, the terminology "(meth)acryloyloxy" is intended to mean acryloyloxy or methacryloyloxy.

BACKGROUND ART

Organosilicon compounds having a hydrolyzable silyl group and an organic group enable to bind organic and inorganic materials, which are normally difficult to bind together, through the mechanism that silanol groups resulting from hydrolysis of the hydrolyzable silyl groups form covalent bonds with hydroxyl groups on the inorganic material surface while the organic groups react with the organic material. With this treatment, the organic/inorganic composite material is improved in heat resistance, water resistance, weather resistance and mechanical strength and endowed with adhesive, dispersing, hydrophobic and rust-preventive properties. For taking advantage of these properties, the organosilicon compounds are utilized in a wide variety of fields and applications such as silane coupling agents, resin additives, surface treating agents, textile treating agents, adhesives, paint additives, and polymer modifiers.

Of the organosilicon compounds, organosilicon compounds having a (meth)acryloyloxy group are useful as radically polymerizable monomers for forming silicon-containing polymers because the (meth)acryloyloxy group, which is a polymerizable functional group, is copolymerizable with various radically polymerizable monomers. Examples of the organosilicon compound having a (meth)acryloyloxy group include 3-acryloyloxypropyltrichlorosilane and 3-methacryloyloxypropyltrichlorosilane as described in Patent Document 1.

The organosilicon compounds having a (meth)acryloyloxy group are generally synthesized through hydrosilylation reaction of hydrohalosilane compounds with (meth)acrylate compounds having an alkenyl group in the presence of platinum catalysts.

CITATION LIST

Patent Document 1: JP-A H11-029583

Disclosure of Invention

The organosilicon compounds having a (meth)acryloyloxy group described in Patent Document 1, however, raise several problems in an attempt to prepare them on an industrial scale because the characteristic polymerizable functional group is susceptible to self-polymerization. Specifically, the polymerizable functional group reacts with radicals generated by heat during preparation, to create new radicals (initiation reaction). The reaction of the polymerizable functional group with radicals is exothermic. As the temperature rises with the progress of reaction, another polymerizable functional group reacts with new radicals in a chain and accelerating manner, leading to self-polymerization (propagation reaction). The self-polymerization invites a sharp rise of temperature, at which the reaction control becomes impossible. Then the reaction solution gasifies or thermally decomposes to evolve combustible gases, and at the worst, to commit accidents like fire and explosion (runaway reaction). There is another problem that polymers clog the system or piping, causing serious damage to the manufacturing process.

For this reason, it is very important to inhibit self-polymerization in the manufacture of the aforementioned organosilicon compounds on an industrial scale. The reactivity of a compound having a polymerizable functional group (referred to as "radically polymerizable monomer", hereinafter) with radicals largely depends on the structure of the radically polymerizable monomer. In the preparation of the organosilicon compounds having a (meth)acryloyloxy group, the starting (meth)acrylate compound and the product, organosilicon compound having a (meth)acryloyloxy group allow for a quick progress of initiation reaction because the (meth)acryloyloxy group has a very high constant of radical growth rate. However, the product organosilicon compound having a (meth)acryloyloxy group does not become the direct cause to induce self-polymerization because the radicals are stabilized due to the substituent effect of a silyl group having great steric hindrance so that the propagation reaction is slow. On the other hand, the starting (meth)acrylate compound becomes the direct cause to induce self-polymerization because the alkenyl group has low steric hindrance so that the propagation reaction is fast.

As is evident from the above discussion, it is very important to establish a means for inhibiting self-polymerization of polymerizable functional groups in the efficient manufacture of (meth)acryloyloxy-containing organosilicon compounds on an industrial scale. Specifically, it is very important to establish a means for inhibiting propagation reaction of the starting (meth)acrylate compound.

Typical means for inhibiting self-polymerization of polymerizable functional groups is addition of various polymerization inhibitors. Of the polymerization inhibitors, phenolic polymerization inhibitors are known as being capable of inhibiting propagation reaction of the starting (meth)acrylate compound. Also, phenolic and hindered phenolic polymerization inhibitors are known as being capable of inhibiting propagation reaction of the product organosilicon compound having a (meth)acryloyloxy group.

In the manufacture of organosilicon compounds having a (meth)acryloyloxy group, the phenolic polymerization inhibitors having a hydroxyl group such as 4-methoxyphenol, can quickly capture radicals created in the system because of the highest reactivity with radicals in the reaction system, thereby inhibiting both initiation reaction and propagation reaction. In the presence of a halosilane compound, however, the polymerization inhibitor ceases to play its own role because the hydroxyl group slowly reacts with the halosilane compound so that the radical capturing ability of the hydroxyl group is lost.

In the case of a hindered phenolic polymerization inhibitor having a substituent of great steric hindrance around a hydroxyl group such as 2,6-di-tert-butyl-4-methylphenol, the hydroxyl group scarcely reacts with the halosilane compound due to the influence of the substituents of great steric hindrance. This hindered phenolic polymerization inhibitor, however, has a moderate degree of reactivity with radicals, fails to rapidly capture radicals as created and to hold down the initiation reaction. Once the initiation reaction starts, radicals undergo a chain and accelerating reaction. Since the reactivity of the hindered phenolic polymerization inhibitor with radicals at this point of time is higher than the reactivity of the product organosilicon compound with radicals, but lower than the reactivity of the starting (meth)acrylate compound with radicals, the inhibitor fails to hold down the propagation reaction of the starting (meth)acrylate compound.

It is thus concluded that the various polymerization inhibitors are insufficient to hold down the propagation reaction of the starting (meth)acrylate compound in the presence of the halosilane compound.

In the industrial scale manufacture of organosilicon compounds having a (meth)acryloyoxy group, it is desired to develop a method capable of holding down the propagation reaction of a starting (meth)acrylate compound.

An object of the invention is to provide a method for preparing an organosilicon compound having a (meth)acryloyloxy group from a starting (meth)acrylate compound on an industrial scale while holding down the propagation reaction of the starting (meth)acrylate compound.

The inventor has found that when a hydrohalosilane compound and a (meth)acrylate compound having an alkenyl group are simultaneously fed in the presence of a polymerization inhibitor to a reaction system, and hydrosilylation reaction is effected in the presence of a platinum catalyst to form a product organosilicon compound having a (meth)acryloyloxy group, the propagation reaction of the starting (meth)acrylate compound is suppressed by controlling the content of the (meth)acrylate compound in the reaction system to a specific proportion relative to the product.

Accordingly, the invention provides a method for preparing an organosilicon compound having a (meth)acryloyloxy group, comprising the steps of simultaneously feeding a hydrohalosilane compound and a (meth)acrylate compound having an alkenyl group in the presence of a polymerization inhibitor to a reaction system, and effecting hydrosilylation reaction in the presence of a platinum catalyst to form the organosilicon compound having a (meth)acryloyloxy group. The hydrohalosilane compound has the general formula (1):

(1)

wherein $R^1$ is a substituted or unsubstituted $C_1$-$C_{10}$ monovalent hydrocarbon group, X is a halogen atom, and n is an integer of 1 to 3. The (meth)acrylate compound has the general formula (2):

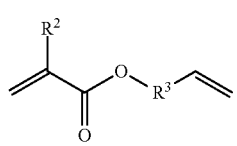

(2)

wherein $R^2$ is hydrogen or methyl and $R^3$ is an unsubstituted $C_1$-$C_{18}$ alkylene group. The organosilicon compound having the general formula (3):

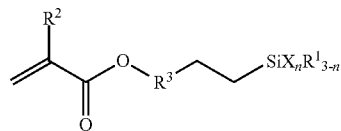

(3)

wherein $R^1$, $R^2$, $R^3$, X, and n are as defined above. The reaction is effected under such conditions that the content of the (meth)acrylate compound having formula (2) accounts for 0 to 100 mol % based on the content of the organosilicon compound having formula (3) in the reaction system.

In a preferred embodiment, the hourly feed rate of the hydrohalosilane compound having formula (1) is 50 to 200 mol % based on the hourly feed rate of the (meth)acrylate compound having formula (2).

Advantageous Effects of Invention

Since the preparation method of the invention involves the step of simultaneously feeding a hydrohalosilane compound and a (meth)acrylate compound having an alkenyl group in the presence of a polymerization inhibitor, the propagation reaction of the starting (meth)acrylate compound is suppressed.

DESCRIPTION OF PREFERRED EMBODIMENTS

According to the invention, a hydrohalosilane compound represented by the formula (1) and a (meth)acrylate compound having an alkenyl group, represented by the formula (2) are simultaneously fed to a reaction system in the presence of a polymerization inhibitor, and hydrosilylation reaction is effected in the presence of a platinum catalyst, thereby preparing an organosilicon compound having a (meth)acryloyloxy group, represented by the formula (3). Notably, the compounds having formulae (1), (2), and (3) are also referred to as compounds (1), (2), and (3), respectively.

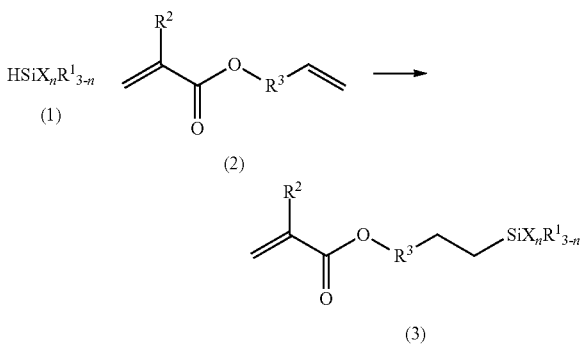

In formulae (1) and (3), $R^1$ is a substituted or unsubstituted, $C_1$-$C_{10}$, preferably $C_1$-$C_8$, more preferably $C_1$-$C_6$, even more preferably $C_1$-$C_3$ monovalent hydrocarbon group. The monovalent hydrocarbon group $R^1$ may be straight, branched or cyclic and examples thereof include straight alkyl groups such as methyl, ethyl, n-propyl, n-butyl, n-pentyl, n-hexyl, n-heptyl, n-octyl, n-nonyl, and n-decyl, branched alkyl groups such as isopropyl, isobutyl, tert-butyl, sec-butyl, isopentyl, neopentyl, isohexyl, isoheptyl, isooctyl, tert-octyl, isononyl, and isodecyl, cyclic alkyl groups such as cyclopentyl and cyclohexyl, alkenyl groups such as vinyl, allyl, butenyl and methallyl, aryl groups such as phenyl, tolyl and xylyl, and aralkyl groups such as benzyl and phenethyl. Inter alia, unsubstituted $C_1$-$C_6$ straight alkyl groups are preferred as $R^1$. Especially from the aspect of availability, unsubstituted $C_1$-$C_3$ straight alkyl groups such as methyl and ethyl are more preferred. In these monovalent hydrocarbon groups, some or all of the hydrogen atoms may be substituted by substituents, for example, $C_1$-$C_3$ alkoxy moieties such as methoxy, ethoxy, and (iso)propoxy, halogen atoms such as fluorine, chlorine and bromine, aromatic hydrocarbon moieties such as phenyl, cyano, amino, ester, ether, carbonyl, acyl and sulfide moieties, and mixtures thereof. The position and number of substituents are not particularly limited.

In formulae (1) and (3), X is a halogen atom. Exemplary halogen atoms include fluorine, chlorine, bromine and iodine atoms, with chlorine being preferred from the aspect of availability.

The subscript n is an integer of 1 to 3. Particularly when the organosilicon compound (3) is used as a silane coupling agent or radically polymerizable monomer, n is preferably 3 because substrate adhesion is enhanced by the reaction of the compound with a plurality of hydroxyl groups on the substrate surface.

In formulae (2) and (3), $R^2$ is hydrogen or methyl.

$R^3$ is an unsubstituted $C_1$-$C_{18}$, preferably $C_1$-$C_{12}$, more preferably $C_1$-$C_8$, even more preferably $C_1$-$C_6$ alkylene group. The alkylene group $R^3$ may be straight, branched or cyclic and examples thereof include straight alkylene groups such as methylene, ethylene, trimethylene, tetramethylene, pentamethylene, hexamethylene, heptamethylene, octamethylene, nonamethylene, decylene, undecylene, dodecylene, tridecylene, tetradecylene, pentadecylene, hexadecylene, heptadecylene, and octadecylene, branched alkylene groups such as propylene, isobutylene, tert-butylene, sec-butylene, isopentylene, neopentylene, isohexylene, isoheptylene, isooctylene, tert-octylene, isononylene, isodecylene, isoundecylene, isododecylene, isotridecylene, isotetradecylene, isopentadecylene, isohexadecylene, isoheptadecylene, and isooctadecylene, and cyclic alkylene groups such as cyclopropylene, cyclopentylene, and cyclohexylene. Inter alia, unsubstituted $C_1$-$C_8$ straight alkylene groups are preferred as $R^3$. Especially from the aspect of availability, unsubstituted $C_1$-$C_6$ straight alkylene groups such as methylene and ethylene are more preferred.

Examples of the compound (1) include fluorosilane compounds such as trifluorosilane, difluoromethylsilane, fluorodimethylsilane, difluoroethylsilane, fluorodiethylsilane, difluorophenylsilane, and fluorodiphenylsilane;

chlorosilane compounds such as trichlorosilane, dichloromethylsilane, chlorodimethylsilane, dichloroethylsilane, chlorodiethylsilane, dichlorophenylsilane, and chlorodiphenylsilane;

bromosilane compounds such as tribromosilane, dibromomethylsilane, bromodimethylsilane, dibromoethylsilane, bromodiethylsilane, dibromophenylsilane, and bromodiphenylsilane; and iodosilane compounds such as triiodosilane, diiodomethylsilane, iododimethylsilane, diiodoethylsilane, iododiethylsilane, diiodophenylsilane, and iododiphenylsilane. Especially from the aspect of availability, trichlorosilane, dichloromethylsilane and chlorodimethylsilane are preferred.

Examples of the compound (2) include acrylate compounds such as allyl acrylate, 3-butenyl acrylate, 4-pentenyl acrylate, 5-hexenyl acrylate, 6-heptenyl acrylate, 7-octenyl acrylate, 8-nonenyl acrylate, 9-decenyl acrylate, 10-undecenyl acrylate, 11-dodecenyl acrylate, 12-tridecenyl acrylate, 13-tetradecenyl acrylate, 14-pentadecenyl acrylate, 15-hexadecenyl acrylate, 16-heptadecenyl acrylate, 17-octadecenyl acrylate, 18-nonadecenyl acrylate, and 19-icosenyl acrylate; and methacrylate compounds such as allyl methacrylate, 3-butenyl methacrylate, 4-pentenyl methacrylate, 5-hexenyl methacrylate, 6-heptenyl methacrylate, 7-octenyl methacrylate, 8-nonenyl methacrylate, 9-decenyl methacrylate, 10-undecenyl methacrylate, 11-dodecenyl methacrylate, 12-tridecenyl methacrylate, 13-tetradecenyl methacrylate, 14-pentadecenyl methacrylate, 15-hexadecenyl methacrylate, 16-heptadecenyl methacrylate, 17-octadecenyl methacrylate, 18-nonadecenyl methacrylate, and 19-icosenyl methacrylate. Especially from the aspect of availability, allyl acrylate, 3-butenyl acrylate, 4-pentenyl acrylate, 5-hexenyl acrylate, 6-heptenyl acrylate, 7-octenyl acrylate, allyl methacrylate, 3-butenyl methacrylate, 4-pentenyl methacrylate, 5-hexenyl methacrylate, 6-heptenyl methacrylate, and 7-octenyl methacrylate are preferred.

Examples of the compound (3) include fluorosilane compounds such as 3-acryloxypropyltrifluorosilane, 3-acryloxypropyldifluoromethylsilane, 3-acryloxypropylfluorodimethylsilane, 4-acryloxybutyltrifluorosilane, 4-acryloxybutyldifluoromethylsilane, 4-acryloxybutylfluorodimethylsilane, 5-acryloxypentyltrifluorosilane, 5-acryloxypentyldifluoromethylsilane, 5-acryloxypentylfluorodimethylsilane, 6-acryloxyhexyltrifluorosilane, 6-acryloxyhexyldifluoromethylsilane, 6-acryloxyhexylfluorodimethylsilane, 7-acryloxyheptyltrifluorosilane, 7-acryloxyheptyldifluoromethylsilane, 7-acryloxyheptylfluorodimethylsilane, 8-acryloxyoctyltrifluorosilane, 8-acryloxyoctyldifluoromethylsilane, 8-acryloxyoctylfluorodimethylsilane, 9-acryloxynonyltrifluorosilane, 9-acryloxynonyldifluoromethylsilane, 9-acryloxynonylfluorodimethylsilane, 10-acryloxydecyltrifluorosilane, 10-acryloxydecyldifluoromethylsilane, 10-acryloxydecylfluorodimethylsilane, 11-acryloxyundecyltrifluorosilane, 11-acryloxyundecyldifluoromethylsilane, 11-acryloxyundecylfluorodimethylsilane, 12-acryloxydodecyltrifluorosilane, 12-acryloxydodecyldifluoromethylsilane, 12-acryloxydodecylfluorodimethylsilane, 13-acryloxytridecyltrifluorosilane, 13-acryloxytridecyldifluoromethylsilane, 13-acryloxytridecylfluorodimethylsilane, 14-acryloxytetradecyltrifluorosilane, 14-acryloxytetradecyldifluoromethylsilane, 14-acryloxytetradecylfluorodimethylsilane, 15-acryloxypentadecyltrifluorosilane, 15-acryloxypentadecyldifluoromethylsilane, 15-acryloxypentadecylfluorodimethylsilane, 16-acryloxyhexadecyltrifluorosilane, 16-acryloxyhexadecyldifluoromethylsilane, 16-acryloxyhexadecylfluorodimethylsilane, 17-acryloxyheptadecyltrifluorosilane, 17-acryloxyheptadecyldifluoromethylsilane, 17-acryloxyheptadecylfluorodimethylsilane, 18-acryloxyoctadecyltrifluorosilane, 18-acryloxyoctadecyldifluoromethylsilane, 18-acryloxyoctadecylfluorodimethylsilane, 19-acryloxynonadecyltrifluorosilane, 19-acryloxynonadecyldifluoromethylsilane, 19-acryloxynonadecylfluorodimethylsilane, 20-acryloxyicosyltrifluorosilane, 20-acryloxyicosyldifluoromethylsilane, 20-acryloxyicosylfluorodimethylsilane, 3-methacryloxypropyltrifluorosilane, 3-methacryloxypropyldifluoromethylsilane, 3-methacryloxypropylfluorodimethylsilane, 4-methacryloxybutyltrifluorosilane, 4-methacryloxybutyldifluoromethylsilane, 4-methacryloxybutylfluorodimethylsilane, 5-methacryloxypentyltrifluorosilane, 5-methacryloxypentyldifluoromethylsilane, 5-methacryloxypentylfluorodimethylsilane, 6-methacryloxyhexyltrifluorosilane, 6-methacryloxyhexyldifluoromethylsilane, 6-methacryloxyhexylfluorodimethylsilane, 7-methacryloxyheptyltrifluorosilane, 7-methacryloxyheptyldifluoromethylsilane, 7-methacryloxyheptylfluorodimethylsilane, 8-methacryloxyoctyltrifluorosilane, 8-methacryloxyoctyldifluoromethylsilane, 8-methacryloxyoctylfluorodimethylsilane, 9-methacryloxynonyltrifluorosilane, 9-methacryloxynonyldifluoromethylsilane, 9-methacryloxynonylfluorodimethylsilane, 10-methacryloxydecyltrifluorosilane, 10-methacryloxydecyldifluoromethylsilane, 10-methacryloxydecylfluorodimethylsilane, 11-methacryloxyundecyltrifluorosilane, 11-methacryloxyundecyldifluoromethylsilane, 11-methacryloxyundecylfluorodimethylsilane, 12-methacryloxydodecyltrifluorosilane, 12-methacryloxydodecyldifluoromethylsilane, 12-methacryloxydodecylfluorodimethylsilane, 13-methacryloxytridecyltrifluorosilane, 13-methacryloxytridecyldifluoromethylsilane, 13-methacryloxytridecylfluorodimethylsilane, 14-methacryloxytetradecyltrifluorosilane, 14-methacryloxytetradecyldifluoromethylsilane, 14-methacryloxytetradecylfluorodimethylsilane, 15-methacryloxypentadecyltrifluorosilane, 15-methacryloxypentadecyldifluoromethylsilane, 15-methacryloxypentadecylfluorodimethylsilane, 16-methacryloxyhexadecyltrifluorosilane, 16-methacryloxyhexadecyldifluoromethylsilane, 16-methacryloxyhexadecylfluorodimethylsilane, 17-methacryloxyheptadecyltrifluorosilane, 17-methacryloxyheptadecyldifluoromethylsilane, 17-methacryloxyheptadecylfluorodimethylsilane, 18-methacryloxyoctadecyltrifluorosilane, 18-methacryloxyoctadecyldifluoromethylsilane, 18-methacryloxyoctadecylfluorodimethylsilane, 19-methacryloxynonadecyltrifluorosilane, 19-methacryloxynonadecyldifluoromethylsilane, 19-methacryloxynonadecylfluorodimethylsilane, 20-methacryloxyicosyltrifluorosilane, 20-methacryloxyicosyldifluoromethylsilane, 20-methacryloxyicosylfluorodimethylsilane;

chlorosilane compounds such as 3-acryloxypropyltrichlorosilane, 3-acryloxypropyldichloromethylsilane, 3-acryloxypropylchlorodimethylsilane, 4-acryloxybutyltrichlorosilane, 4-acryloxybutyldichloromethylsilane, 4-acryloxybutylchlorodimethylsilane, 5-acryloxypentyltrichlorosilane, 5-acryloxypentyldichloromethylsilane, 5-acryloxypentylchlorodimethylsilane, 6-acryloxyhexyltrichlorosilane, 6-acryloxyhexyldichloromethylsilane, 6-acryloxyhexylchlorodimethylsilane, 7-acryloxyheptyltrichlorosilane, 7-acryloxyheptyldichloromethylsilane, 7-acryloxyheptylchlorodimethylsilane, 8-acryloxyoctyltrichlorosilane, 8-acryloxyoctyldichloromethylsilane, 8-acryloxyoctylchlorodimethylsilane, 9-acryloxynonyltrichlorosilane, 9-acryloxynonyldichloromethylsilane, 9-acryloxynonylchlorodimethylsilane, 10-acryloxydecyltrichlorosilane, 10-acryloxydecyldichloromethylsilane, 10-acryloxydecylchlorodimethylsilane, 11-acryloxyundecyltrichlorosilane, 11-acryloxyundecyldichloromethylsilane, 11-acryloxyundecylchlorodimethylsilane, 12-acryloxydodecyltrichlorosilane, 12-acryloxydodecyldichloromethylsilane, 12-acryloxydodecylchlorodimethylsilane, 13-acryloxytridecyltrichlorosilane, 13-acryloxytridecyldichloromethylsilane, 13-acryloxytridecylchlorodimethylsilane, 14-acryloxytetradecyltrichlorosilane, 14-acryloxytetradecyldichloromethylsilane, 14-acryloxytetradecylchlorodimethylsilane, 15-acryloxypentadecyltrichlorosilane, 15-acryloxypentadecyldichloromethylsilane, 15-acryloxypentadecylchlorodimethylsilane, 16-acryloxyhexadecyltrichlorosilane, 16-acryloxyhexadecyldichloromethylsilane, 16-acryloxyhexadecylchlorodimethylsilane, 17-acryloxyheptadecyltrichlorosilane, 17-acryloxyheptadecyldichloromethylsilane, 17-acryloxyheptadecylchlorodimethylsilane, 18-acryloxyoctadecyltrichlorosilane, 18-acryloxyoctadecyldichloromethylsilane, 18-acryloxyoctadecylchlorodimethylsilane, 19-acryloxynonadecyltrichlorosilane, 19-acryloxynonadecyldichloromethylsilane, 19-acryloxynonadecylchlorodimethylsilane, 20-acryloxyicosyltrichlorosilane, 20-acryloxyicosyldichloromethylsilane, 20-acryloxyicosylchlorodimethylsilane, 3-methacryloxypropyltrichlorosilane, 3-methacryloxypropyldichloromethylsilane, 3-methacryloxypropylchlorodimethylsilane, 4-methacryloxybutyltrichlorosilane, 4-methacryloxybutyldichloromethylsilane, 4-methacryloxybutylchlorodimethylsilane, 5-methacryloxypentyltrichlorosilane, 5-methacryloxypentyldichloromethylsilane, 5-methacryloxypentylchlorodimethylsilane, 6-methacryloxyhexyltrichlorosilane, 6-methacryloxyhexyldichloromethylsilane, 6-methacryloxyhexylchlorodimethylsilane, 7-methacryloxyheptyltrichlorosilane, 7-methacryloxyheptyldichloromethylsilane, 7-methacryloxyheptylchlorodimethylsilane, 8-methacryloxyoctyltrichlorosilane, 8-methacryloxyoctyldichloromethylsilane, 8-methacryloxyoctylchlorodimethylsilane, 9-methacryloxynonyltrichlorosilane, 9-methacryloxynonyldichloromethylsilane, 9-methacryloxynonylchlorodimethylsilane, 10-methacryloxydecyltrichlorosilane, 10-methacryloxydecyldichloromethylsilane, 10-methacryloxydecylchlorodimethylsilane, 11-methacryloxyundecyltrichlorosilane, 11-methacryloxyundecyldichloromethylsilane, 11-methacryloxyundecylchlorodimethylsilane, 12-methacryloxydodecyltrichlorosilane, 12-methacryloxydodecyldichloromethylsilane, 12-methacryloxydodecylchlorodimethylsilane, 13-methacryloxytridecyltrichlorosilane, 13-methacryloxytridecyldichloromethylsilane, 13-methacryloxytridecylchlorodimethylsilane, 14-methacryloxytetradecyltrichlorosilane, 14-methacryloxytetradecyldichloromethylsilane, 14-methacryloxytetradecylchlorodimethylsilane, 15-methacryloxypentadecyltrichlorosilane, 15-methacryloxypentadecyldichloromethylsilane, 15-methacryloxypentadecylchlorodimethylsilane, 16-methacryloxyhexadecyltrichlorosilane, 16-methacryloxyhexadecyldichloromethylsilane, 16-methacryloxyhexadecylchlorodimethylsilane, 17-methacryloxyheptadecyltrichlorosilane, 17-methacryloxyheptadecyldichloromethylsilane, 17-methacryloxyheptadecylchlorodimethylsilane, 18-methacryloxyoctadecyltrichlorosilane, 18-methacryloxyoctadecyldichloromethylsilane, 18-methacryloxyoctadecylchlorodimethylsilane, 19-methacryloxynonadecyltrichlorosilane, 19-methacryloxynonadecyldichloromethylsilane, 19-methacryloxynonadecylchlorodimethylsilane, 20-methacryloxyicosyltrichlorosilane, 20-methacryloxyicosyldichloromethylsilane, 20-methacryloxyicosylchlorodimethylsilane;

bromosilane compounds such as 3-acryloxypropyltribromosilane, 3-acryloxypropyldibromomethylsilane, 3-acryloxypropylbromodimethylsilane, 4-acryloxybutyltribromosilane, 4-acryloxybutyldibromomethylsilane, 4-acryloxybutylbromodimethylsilane, 5-acryloxypentyltribromosilane, 5-acryloxypentyldibromomethylsilane, 5-acryloxypentylbromodimethylsilane, 6-acryloxyhexyltribromosilane, 6-acryloxyhexyldibromomethylsilane, 6-acryloxyhexylbromodimethylsilane, 7-acryloxyheptyltribromosilane, 7-acryloxyheptyldibromomethylsilane, 7-acryloxyheptylbromodimethylsilane, 8-acryloxyoctyltribromosilane, 8-acryloxyoctyldibromomethylsilane, 8-acryloxyoctylbromodimethylsilane, 9-acryloxynonyltribromosilane, 9-acryloxynonyldibromomethylsilane, 9-acryloxynonylbromodimethylsilane, 10-acryloxydecyltribromosilane, 10-acryloxydecyldibromomethylsilane, 10-acryloxydecylbromodimethylsilane, 11-acryloxyundecyltribromosilane, 11-acryloxyundecyldibromomethylsilane, 11-acryloxyundecylbromodimethylsilane, 12-acryloxydodecyltribromosilane, 12-acryloxydodecyldibromomethylsilane, 12-acryloxydodecylbromodimethylsilane, 13-acryloxytridecyltribromosilane, 13-acryloxytridecyldibromomethylsilane, 13-acryloxytridecylbromodimethylsilane, 14-acryloxytetradecyltribromosilane, 14-acryloxytetradecyldibromomethylsilane, 14-acryloxytetradecylbromodimethylsilane, 15-acryloxypentadecyltribromosilane, 15-acryloxypentadecyldibromomethylsilane, 15-acryloxypentadecylbromodimethylsilane, 16-acryloxyhexadecyltribromosilane, 16-acryloxyhexadecyldibromomethylsilane, 16-acryloxyhexadecylbromodimethylsilane, 17-acryloxyheptadecyltribromosilane, 17-acryloxyheptadecyldibromomethylsilane, 17-acryloxyheptadecylbromodimethylsilane, 18-acryloxyoctadecyltribromosilane, 18-acryloxyoctadecyldibromomethylsilane, 18-acryloxyoctadecylbromodimethylsilane, 19-acryloxynonadecyltribromosilane, 19-acryloxynonadecyldibromomethylsilane, 19-acryloxynonadecylbromodimethylsilane, 20-acryloxyicosyltribromosilane, 20-acryloxyicosyldibromomethylsilane, 20-acryloxyicosylbromodimethylsilane, 3-methacryloxypropyltribromosilane, 3-methacryloxypropyldibromomethylsilane, 3-methacryloxypropylbromodimethylsilane, 4-methacryloxybutyltribromosilane, 4-methacryloxybutyldibromomethylsilane, 4-methacryloxybutylbromodimethylsilane, 5-methacryloxypentyltribromosilane, 5-methacryloxypentyldibromomethylsilane, 5-methacryloxypentylbromodimethylsilane, 6-methacryloxyhexyltribromosilane, 6-methacryloxyhexyldibromomethylsilane, 6-methacryloxyhexylbromodimethylsilane, 7-methacryloxyheptyltribromosilane, 7-methacryloxyheptyldibromomethylsilane, 7-methacryloxyheptylbromodimethylsilane, 8-methacryloxyoctyltribromosilane, 8-methacryloxyoctyldibromomethylsilane, 8-methacryloxyoctylbromodimethylsilane, 9-methacryloxynonyltribromosilane, 9-methacryloxynonyldibromomethylsilane, 9-methacryloxynonylbromodimethylsilane, 10-methacryloxydecyltribromosilane, 10-methacryloxydecyldibromomethylsilane, 10-methacryloxydecylbromodimethylsilane, 11-methacryloxyundecyltribromosilane, 11-methacryloxyundecyldibromomethylsilane, 11-methacryloxyundecylbromodimethylsilane, 12-methacryloxydodecyltribromosilane, 12-methacryloxydodecyldibromomethylsilane, 12-methacryloxydodecylbromodimethylsilane, 13-methacryloxytridecyltribromosilane, 13-methacryloxytridecyldibromomethylsilane, 13-methacryloxytridecylbromodimethylsilane, 14-methacryloxytetradecyltribromosilane, 14-methacryloxytetradecyldibromomethylsilane, 14-methacryloxytetradecylbromodimethylsilane, 15-methacryloxypentadecyltribromosilane, 15-methacryloxypentadecyldibromomethylsilane, 15-methacryloxypentadecylbromodimethylsilane, 16-methacryloxyhexadecyltribromosilane, 16-methacryloxyhexadecyldibromomethylsilane, 16-methacryloxyhexadecylbromodimethylsilane, 17-methacryloxyheptadecyltribromosilane, 17-methacryloxyheptadecyldibromomethylsilane, 17-methacryloxyheptadecylbromodimethylsilane, 18-methacryloxyoctadecyltribromosilane, 18-methacryloxyoctadecyldibromomethylsilane, 18-methacryloxyoctadecylbromodimethylsilane, 19-methacryloxynonadecyltribromosilane, 19-methacryloxynonadecyldibromomethylsilane, 19-methacryloxynonadecylbromodimethylsilane, 20-methacryloxyicosyltribromosilane, 20-methacryloxyicosyldibromomethylsilane, 20-methacryloxyicosylbromodimethylsilane;

iodosilane compounds such as 3-acryloxypropyltriiodosilane, 3-acryloxypropyldiiodomethylsilane, 3-acryloxypropyliododimethylsilane, 4-acryloxybutyltriiodosilane, 4-acryloxybutyldiiodomethylsilane, 4-acryloxybutyliododimethylsilane, 5-acryloxypentyltriiodosilane, 5-acryloxypentyldiiodomethylsilane, 5-acryloxypentyliododimethylsilane, 6-acryloxyhexyltriiodosilane, 6-acryloxyhexyldiiodomethylsilane, 6-acryloxyhexyliododimethylsilane, 7-acryloxyheptyltriiodosilane, 7-acryloxyheptyldiiodomethylsilane, 7-acryloxyheptyliododimethylsilane, 8-acryloxyoctyltriiodosilane, 8-acryloxyoctyldiiodomethylsilane, 8-acryloxyoctyliododimethylsilane, 9-acryloxynonyltriiodosilane, 9-acryloxynonyldiiodomethylsilane, 9-acryloxynonyliododimethylsilane, 10-acryloxydecyltriiodosilane, 10-acryloxydecyldiiodomethylsilane, 10-acryloxydecyliododimethylsilane, 11-acryloxyundecyltriiodosilane, 11-acryloxyundecyldiiodomethylsilane, 11-acryloxyundecyliododimethylsilane, 12-acryloxydodecyltriiodosilane, 12-acryloxydodecyldiiodomethylsilane, 12-acryloxydodecyliododimethylsilane, 13-acryloxytridecyltriiodosilane, 13-acryloxytridecyldiiodomethylsilane, 13-acryloxytridecyliododimethylsilane, 14-acryloxytetradecyltriiodosilane, 14-acryloxytetradecyldiiodomethylsilane, 14-acryloxytetradecyliododimethylsilane, 15-acryloxypentadecyltriiodosilane, 15-acryloxypentadecyldiiodomethylsilane, 15-acryloxypentadecyliododimethylsilane, 16-acryloxyhexadecyltriiodosilane, 16-acryloxyhexadecyldiiodomethylsilane, 16-acryloxyhexadecyliododimethylsilane, 17-acryloxyheptadecyltriiodosilane, 17-acryloxyheptadecyldiiodomethylsilane, 17-acryloxyheptadecyliododimethylsilane, 18-acryloxyoctadecyltriiodosilane, 18-acryloxyoctadecyldiiodomethylsilane, 18-acryloxyoctadecyliododimethylsilane, 19-acryloxynonadecyltriiodosilane, 19-acryloxynonadecyldiiodomethylsilane, 19-acryloxynonadecyliododimethylsilane, 20-acryloxyicosyltriiodosilane, 20-acryloxyicosyldiiodomethylsilane, 20-acryloxyicosyliododimethylsilane, 3-methacryloxypropyltriiodosilane, 3-methacryloxypropyldiiodomethylsilane, 3-methacryloxypropyliododimethylsilane, 4-methacryloxybutyltriiodosilane, 4-methacryloxybutyldiiodomethylsilane, 4-methacryloxybutyliododimethylsilane, 5-methacryloxypentyltriiodosilane, 5-methacryloxypentyldiiodomethylsilane, 5-methacryloxypentyliododimethylsilane, 6-methacryloxyhexyltriiodosilane, 6-methacryloxyhexyldiiodomethylsilane, 6-methacryloxyhexyliododimethylsilane, 7-methacryloxyheptyltriiodosilane, 7-methacryloxyheptyldiiodomethylsilane, 7-methacryloxyheptyliododimethylsilane, 8-methacryloxyoctyltriiodosilane, 8-methacryloxyoctyldiiodomethylsilane, 8-methacryloxyoctyliododimethylsilane, 9-methacryloxynonyltriiodosilane, 9-methacryloxynonyldiiodomethylsilane, 9-methacryloxynonyliododimethylsilane, 10-methacryloxydecyltriiodosilane, 10-methacryloxydecyldiiodomethylsilane, 10-methacryloxydecyliododimethylsilane, 11-methacryloxyundecyltriiodosilane, 11-methacryloxyundecyldiiodomethylsilane, 11-methacryloxyundecyliododimethylsilane, 12-methacryloxydodecyltriiodosilane, 12-methacryloxydodecyldiiodomethylsilane, 12-methacryloxydodecyliododimethylsilane, 13-methacryloxytridecyltriiodosilane, 13-methacryloxytridecyldiiodomethylsilane, 13-methacryloxytridecyliododimethylsilane, 14-methacryloxytetradecyltriiodosilane, 14-methacryloxytetradecyldiiodomethylsilane, 14-methacryloxytetradecyliododimethylsilane, 15-methacryloxypentadecyltriiodosilane, 15-methacryloxypentadecyldiiodomethylsilane, 15-methacryloxypentadecyliododimethylsilane, 16-methacryloxyhexadecyltriiodosilane, 16-methacryloxyhexadecyldiiodomethylsilane, 16-methacryloxyhexadecyliododimethylsilane, 17-methacryloxyheptadecyltriiodosilane, 17-methacryloxyheptadecyldiiodomethylsilane, 17-methacryloxyheptadecyliododimethylsilane, 18-methacryloxyoctadecyltriiodosilane, 18-methacryloxyoctadecyldiiodomethylsilane, 18-methacryloxyoctadecyliododimethylsilane, 19-methacryloxynonadecyltriiodosilane, 19-methacryloxynonadecyldiiodomethylsilane, 19-methacryloxynonadecyliododimethylsilane, 20-methacryloxyicosyltriiodosilane, 20-methacryloxyicosyldiiodomethylsilane, 20-methacryloxyicosyliododimethylsilane.

Inter alia, from the aspect of availability of precursor reactants, preference is given to 3-acryloxypropyltrichlorosilane, 3-acryloxypropyldichloromethylsilane, 3-acryloxypropylchlorodimethylsilane, 4-acryloxybutyltrichlorosilane, 4-acryloxybutyldichloromethylsilane, 4-acryloxybutylchlorodimethylsilane, 5-acryloxypentyltrichlorosilane, 5-acryloxypentyldichloromethylsilane, 5-acryloxypentylchlorodimethylsilane, 6-acryloxyhexyltrichlorosilane, 6-acryloxyhexyldichloromethylsilane, 6-acryloxyhexylchlorodimethylsilane, 7-acryloxyheptyltrichlorosilane, 7-acryloxyheptyldichloromethylsilane, 7-acryloxyheptylchlorodimethylsilane, 8-acryloxyoctyltrichlorosilane, 8-acryloxyoctyldichloromethylsilane, 8-acryloxyoctylchlorodimethylsilane, 3-methacryloxypropyltrichlorosilane, 3-methacryloxypropyldichloromethylsilane, 3-methacryloxypropylchlorodimethylsilane, 4-methacryloxybutyltrichlorosilane, 4-methacryloxybutyldichloromethylsilane, 4-methacryloxybutylchlorodimethylsilane, 5-methacryloxypentyltrichlorosilane, 5-methacryloxypentyldichloromethylsilane, 5-methacryloxypentylchlorodimethylsilane, 6-methacryloxyhexyltrichlorosilane, 6-methacryloxyhexyldichloromethylsilane, 6-methacryloxyhexylchlorodimethylsilane, 7-methacryloxyheptyltrichlorosilane, 7-methacryloxyheptyldichloromethylsilane, 7-methacryloxyheptylchlorodimethylsilane, 8-methacryloxyoctyltrichlorosilane, 8-methacryloxyoctyldichloromethylsilane, and 8-methacryloxyoctylchlorodimethylsilane.

The preparation method of the invention includes the steps of simultaneously feeding compound (1) and compound (2) to a reaction system and effecting hydrosilylation reaction. Once compound (2) is fed to the reaction system, it quickly reacts with compound (1) and converts to compound (3). This shortens the thermal history that compound (2) undergoes and at the same time, minimizes the content of compound (2) in the reaction system. As the thermal history is shortened, less radicals are created, which reduces the probability of initiation reaction occurring. As the content of compound (2) in the reaction system is minimized, there are fewer opportunities to contact with radicals, which reduces the probability of propagation reaction occurring.

It is not critical how to simultaneously feed compound (1) and compound (2) to the reaction system. In one exemplary mode, compound (1) and compound (2) are separately and simultaneously fed. In another mode, compound (1) and compound (2) are mixed and fed. In an alternative mode, compound (1) and compound (2) are divided into plural portions, which are separately and simultaneously fed or which are mixed and fed.

The hourly feed rate of compound (1) is not particularly limited as long as hydrosilylation reaction takes place. From the aspects of thermal history of compound (2) and the content of compound (2) in the reaction system, the hourly feed rate of compound (1) is preferably 50 to 200 mol %, more preferably 80 to 120 mol %, even more preferably 90 to 108 mol % based on the hourly feed rate of compound (2).

In the inventive method, the reaction is effected such that the content of compound (2) in the reaction system accounts for 0 to 100 mol % based on the content of the product or compound (3) in the reaction system. The content of compound (2) in the reaction system is in proportional relationship to the probability of propagation reaction. When the content of compound (2) is less than 100 mol % based on the content of compound (3), there are few chances of contact with radicals so that the probability of propagation reaction is low.

Means for determining the contents of compounds (1), (2) and (3) in the reaction system is not particularly limited and may be selected from various analytic means including gas chromatography, high speed liquid chromatography, thin layer chromatography, nuclear magnetic resonance (NMR) spectroscopy, infrared (IR) spectroscopy, and near-infrared (NIR) spectroscopy.

The polymerization inhibitor used herein may be selected from polymerization inhibitors which are effective for well-known radical polymerizations.

Examples include methoxyphenol compounds such as 4-methoxyphenol, 2-methyl-4-methoxyphenol, 3-methyl-4-methoxyphenol, 2,3-dimethyl-4-methoxyphenol, 2,5-dimethyl-4-methoxyphenol, 2,6-dimethyl-4-methoxyphenol, 3,5-dimethyl-4-methoxyphenol, 2-tert-butyl-4-methoxyphenol, 3-tert-butyl-4-methoxyphenol, 2-methyl-3-tert-butyl-4-methoxyphenol, 3-tert-butyl-5-methyl-4-methoxyphenol, 2,3-di-tert-butyl-4-methoxyphenol, and 2,5-di-tert-butyl-4-methoxyphenol;

hydroxyphenol compounds such as 4-hydroxyphenol, 2-methyl-4-hydroxyphenol, 3-methyl-4-hydroxyphenol, 2,3-dimethyl-4-hydroxyphenol, 2,5-dimethyl-4-hydroxyphenol, 2,6-dimethyl-4-hydroxyphenol, 3,5-dimethyl-4-hydroxyphenol, 2-tert-butyl-4-hydroxyphenol, 3-tert-butyl-4-hydroxyphenol, 2-methyl-3-tert-butyl-4-hydroxyphenol, and 3-tert-butyl-5-methyl-4-hydroxyphenol;

hindered phenol compounds such as 2,6-di-tert-butyl-4-methylphenol, 2,6-di-tert-butyl-4-ethylphenol, 4,4-methylenebis(2,6-di-tert-butylphenol), 2,2-methylenebis(6-tert-butyl-4-methylphenol), 2,2-methylenebis(6-tert-butyl-4-ethylphenol), 2,6-di-tert-butyl-4-dimethylaminomethylphenol, 2,6-di-tert-butyl-4-methoxyphenol, 2,6-di-tert-butyl-4-hydroxyphenol, pentaerythritol tetrakis[3-(3,5-di-tert-butyl-4-hydroxyphenyl)propionate], 2,2-thiodiethylenebis[3-(3,5-di-tert-butyl-4-hydroxyphenyl)propionate], octadecyl-3-(3,5-di-tert-butyl-4-hydroxyphenyl)propionate, N,N-hexamethylenebis[3-(3,5-di-tert-butyl-4-hydroxyphenyl)propionamide, 2,4,6-tris(3,5-di-tert-butyl-4-hydroxybenzyl)mesitylene, hexamethylenebis[3-(3,5-di-tert-butyl-4-hydroxyphenyl)

propionate], and 3,4-dihydro-2,5,7,8-tetramethyl-2-(4,8,12-trimethyltridecyl)-2H-1-benzopyran-6-ol;

quinone compounds such as p-benzoquinone, methyl-p-benzoquinone, tert-butyl-p-benzoquinone, 2,5-diphenyl-p-benzoquinone;

copper compounds such as cuprous chloride, cupric chloride, cuprous oxide, cupric oxide, copper sulfate, and copper dimethyldithiocarbamate;

nitrogen-containing compounds such as phenothiazine, diphenylamine, alkylated diphenylamines, phenylenediamine, N,N-diphenyl-p-phenylenediamine, N,N-dinaphthyl-p-phenylenediamine, 4-hydroxy-2,2,6,6-tetramethylpiperidine, 4-benzoyloxy-2,2,6,6-tetramethylpiperidine, 1,4-dihydroxy-2,2,6,6-tetramethylpiperidine, and 1-hydroxy-4-benzoyloxy-2,2,6,6-tetramethylpiperidine;

phosphorus-containing compounds such as tri-n-hexylphosphine, tri-n-octylphosphine, triphenylphosphine, tris(2-methylphenyl)phosphine, tris(4-methylphenyl)phosphine, tris(6-methylphenyl)phosphine, tris(2,4-di-tert-butylphenyl)phosphine, triphenyl phosphite, zinc dialkyldithiophosphates, and zinc diallyldithiophosphate;

sulfur-containing compounds such as butyl sulfide, didodecyl 3,3'-thiodipropionate, tetramethylthiuram disulfide; and aliphatic conjugated unsaturated bond-containing compounds such as tung oil, dehydrated castor oil, and conjugated linoleic acid. These polymerization inhibitors may be used alone or in admixture.

Inter alia, from the aspect of a polymerization inhibiting effect in the presence of a halosilane compound, preference is given to hindered phenol compounds such as 2,6-di-tert-butyl-4-methylphenol, 4,4-methylenebis(2,6-di-tert-butylphenol), 2,2-methylenebis(6-tert-butyl-4-methylphenol), 2,6-di-tert-butyl-4-dimethylaminomethylphenol, 2,6-di-tert-butyl-4-methoxyphenol, 2,6-di-tert-butyl-4-hydroxyphenol, and 3,4-dihydro-2,5,7,8-tetramethyl-2-(4,8, 12-trimethyltridecyl)-2H-1-benzopyran-6-ol.

The amount of the polymerization inhibitor used is not particularly limited as long as it is sufficient to exert the desired effect to compound (3). From the aspect of productivity, the polymerization inhibitor is preferably used in an amount of 0.0001 to 10% by weight, more preferably 0.001 to 5% by weight, even more preferably 0.01 to 1% by weight based on compound (3).

In the method of the invention, besides the polymerization inhibitor, any other additives such as antioxidants, vulcanization accelerators, metal inactivating agents, UV absorbers and photo-stabilizers may be used alone or in combination as long as they do not lower the reactivity of hydrosilylation reaction or adversely affect the quality of the final product, compound (3).

The platinum catalyst used herein may be selected from well-known platinum (Pt) and complex compounds having platinum as the center metal. Examples include chloroplatinic acid, alcohol solutions of chloroplatinic acid such as 2-ethylhexanol solution of chloroplatinic(IV) acid, toluene or xylene solution of platinum/1,3-divinyl-1,1,3,3-tetramethyldisiloxane complex, dichlorobisacetonitrile platinum, dichlorobisbenzonitrile platinum, and dichlorocyclooctadiene platinum. Also useful are platinum black on carriers such as alumina, silica and carbon. Preferred from the aspect of reactivity are alcohol solutions of chloroplatinic acid such as 2-ethylhexanol solution of chloroplatinic (IV) acid, and toluene or xylene solution of platinum/1,3-divinyl-1,1,3,3-tetramethyldisiloxane complex.

The amount of the platinum catalyst used is not particularly limited as long as a catalytic effect is exerted on hydrosilylation reaction. From the aspects of reactivity and productivity, the platinum catalyst is preferably used in such an amount as to provide 0.0000001 to 1 mole, more preferably 0.000001 to 0.1 mole, even more preferably 0.00001 to 0.01 mole of metallic platinum per mole of compound (2).

Although the temperature of hydrosilylation reaction is not particularly limited, it is preferred from the aspects of reactivity and productivity that the temperature be 50 to 200° C., more preferably 50 to 150° C., even more preferably 50 to 100° C. Although the time of hydrosilylation reaction is not particularly limited, the reaction time is preferably 1 to 30 hours, more preferably 1 to 20 hours, even more preferably 1 to 10 hours.

Although the hydrosilylation reaction takes place in a solventless system, a solvent may be used. Suitable solvents include hydrocarbon solvents such as pentane, hexane, cyclohexane, heptane, isooctane, benzene, toluene, and xylene, ether solvents such as diethyl ether, tetrahydrofuran, and dioxane, ester solvents such as ethyl acetate and butyl acetate, aprotic polar solvents such as acetonitrile and N,N-dimethylformamide, and chlorinated hydrocarbon solvents such as dichloromethane and chloroform, which may be used alone or in admixture.

EXAMPLES

Examples and Comparative Examples are given below for further illustrating the invention although the invention is not limited thereto.

The proportion of components in a reaction mixture was measured by gas chromatography under the following conditions.

Gas Chromatography Measurement

| | |
|---|---|
| Gas chromatograph: | GC-2014 (Shimadzu Corp.) |
| Packed column: | Silicone SE-30 (GL Sciences) |
| Detector: | TCD |
| Detector temperature: | 300° C. |
| Injection port temperature: | 300° C. |
| Heating program: | 70° C. (0 min.) → 10° C./min → 300° C. (10 min.) |
| Carrier gas: | helium (50 ml/min) |
| Injection amount: | 1 μl |

Example 1

Synthesis of 3-acryloxypropyltrichlorosilane

A flask equipped with a stirrer, reflux condenser, dropping funnel and thermometer at room temperature was charged with 0.1 g (corresponding to 0.1 wt % relative to allyl acrylate) of 2,6-di-tert-butyl-4-methylphenol, an amount (to provide 0.00001 mole of Pt) of a 2-ethylhexanol solution of chloroplatinic (IV) acid, and 26.0 g (30 mL) of toluene, and heated at 70° C. Once the internal temperature became steady, 135.5 g (1.000 mole) of trichlorosilane and 112.1 g (1.000 mole) of allyl acrylate were separately, continuously, simultaneously fed at 70-80° C. over 3 hours, followed by 1 hour of stirring at the temperature. In this Example, trichlorosilane and allyl acrylate were fed in a molar ratio of 1:1, and the hourly feed rate of trichlorosilane was always constant and 100 mol % relative to allyl acrylate.

The reaction mixture was analyzed by gas chromatography, finding that allyl acrylate (starting reactant), trichlorosilane, and 3-acryloxypropyltrichlorosilane (product) were in a percent area ratio of 11:0:89. The area ratio of compounds was converted to a weight ratio, and the contents of compounds were computed based on the molecular weight and weight ratio of each compound. The content of allyl acrylate in the reaction system was 27 mol % based on the content of 3-acryloxypropyltrichlorosilane.

A 20-ml screw cap test tube was thoroughly purged with nitrogen, filled with 10 g of the reaction mixture, and capped, after which it was heated at 100° C. for testing thermal stability. After 30 hours, the reaction mixture remained flowing, indicating no tendency to self-polymerization.

Example 2

Synthesis of 3-acryloxypropyltrichlorosilane

Reaction was performed as in Example 1 except that 135.5 g (1.000 mole) of trichlorosilane and 112.1 g (1.000 mole) of allyl acrylate were mixed and the mixture was continuously fed at 70-80° C. over 3 hours.

The reaction mixture was analyzed by gas chromatography, finding that allyl acrylate (starting reactant), trichlorosilane, and 3-acryloxypropyltrichlorosilane (product) were in a percent area ratio of 9:0:91. The area ratio of compounds was converted to a weight ratio, and the contents of compounds were computed based on the molecular weight and weight ratio of each compound. The content of allyl acrylate in the reaction system was 22 mol % based on the content of 3-acryloxypropyltrichlorosilane.

A 20-ml screw cap test tube was thoroughly purged with nitrogen, filled with 10 g of the reaction mixture, and capped, after which it was heated at 100° C. for testing thermal stability. After 30 hours, the reaction mixture remained flowing, indicating no tendency to self-polymerization.

Example 3

Synthesis of 3-acryloxypropyltrichlorosilane

Reaction was performed as in Example 1 except that toluene was omitted.

The reaction mixture was analyzed by gas chromatography, finding that allyl acrylate (starting reactant), trichlorosilane, and 3-acryloxypropyltrichlorosilane (product) were in a percent area ratio of 12:0:88. The area ratio of compounds was converted to a weight ratio, and the contents of compounds were computed based on the molecular weight and weight ratio of each compound. The content of allyl acrylate in the reaction system was 30 mol % based on the content of 3-acryloxypropyltrichlorosilane.

A 20-ml screw cap test tube was thoroughly purged with nitrogen, filled with 10 g of the reaction mixture, and capped, after which it was heated at 100° C. for testing thermal stability. After 30 hours, the reaction mixture remained flowing, indicating no tendency to self-polymerization.

Example 4

Synthesis of 3-acryloxypropyltrichlorosilane

Reaction was performed as in Example 2 except that 149.1 g (1.100 mole) of trichlorosilane and 112.1 g (1.000 mole) of allyl acrylate were used. In this Example, trichlorosilane and allyl acrylate were fed in a molar ratio of 1.1:1, and the hourly feed rate of trichlorosilane was always constant and 110 mol % relative to allyl acrylate.

The reaction mixture was analyzed by gas chromatography, finding that allyl acrylate (starting reactant), trichlorosilane, and 3-acryloxypropyltrichlorosilane (product) were in a percent area ratio of 4:0:96. The area ratio of compounds was converted to a weight ratio, and the contents of compounds were computed based on the molecular weight and weight ratio of each compound. The content of allyl acrylate in the reaction system was 9 mol % based on the content of 3-acryloxypropyltrichlorosilane.

A 20-ml screw cap test tube was thoroughly purged with nitrogen, filled with 10 g of the reaction mixture, and capped, after which it was heated at 100° C. for testing thermal stability. After 30 hours, the reaction mixture remained flowing, indicating no tendency to self-polymerization.

Example 5

Synthesis of 3-acryloxypropyltrichlorosilane

Reaction was performed as in Example 2 except that 162.6 g (1.200 mole) of trichlorosilane and 112.1 g (1.000 mole) of allyl acrylate were used. In this Example, trichlorosilane and allyl acrylate were fed in a molar ratio of 1.2:1, and the hourly feed rate of trichlorosilane was always constant and 120 mol % relative to allyl acrylate.

The reaction mixture was analyzed by gas chromatography, finding that allyl acrylate (starting reactant), trichlorosilane, and 3-acryloxypropyltrichlorosilane (product) were in a percent area ratio of 0:4:96. The area ratio of compounds was converted to a weight ratio, and the contents of compounds were computed based on the molecular weight and weight ratio of each compound. The content of allyl acrylate in the reaction system was 0 mol % based on the content of 3-acryloxypropyltrichlorosilane.

A 20-ml screw cap test tube was thoroughly purged with nitrogen, filled with 10 g of the reaction mixture, and capped, after which it was heated at 100° C. for testing thermal stability. After 30 hours, the reaction mixture remained flowing, indicating no tendency to self-polymerization.

Example 6

Synthesis of 3-acryloxypropyltrichlorosilane

Reaction was performed as in Example 2 except that 108.4 g (0.800 mole) of trichlorosilane and 112.1 g (1.000 mole) of allyl acrylate were used. In this Example, trichlorosilane and allyl acrylate were fed in a molar ratio of 0.8:1, and the hourly feed rate of trichlorosilane was always constant and 80 mol % relative to allyl acrylate.

The reaction mixture was analyzed by gas chromatography, finding that allyl acrylate (starting reactant), trichlorosilane, and 3-acryloxypropyltrichlorosilane (product) were in a percent area ratio of 15:0:85. The area ratio of compounds was converted to a weight ratio, and the contents of compounds were computed based on the molecular weight and weight ratio of each compound. The content of allyl acrylate in the reaction system was 39 mol % based on the content of 3-acryloxypropyltrichlorosilane.

A 20-ml screw cap test tube was thoroughly purged with nitrogen, filled with 10 g of the reaction mixture, and capped, after which it was heated at 100° C. for testing thermal stability. After 30 hours, the reaction mixture remained flowing, indicating no tendency to self-polymerization.

Example 7

Synthesis of 3-acryloxypropyltrichlorosilane

Reaction was performed as in Example 2 except that 67.8 g (0.500 mole) of trichlorosilane and 112.1 g (1.000 mole) of allyl acrylate were used. In this Example, trichlorosilane and allyl acrylate were fed in a molar ratio of 0.5:1, and the hourly feed rate of trichlorosilane was always constant and 50 mol % relative to allyl acrylate.

The reaction mixture was analyzed by gas chromatography, finding that allyl acrylate (starting reactant), trichlorosilane, and 3-acryloxypropyltrichlorosilane (product) were in a percent area ratio of 29:0:71. The area ratio of compounds was converted to a weight ratio, and the contents of compounds were computed based on the molecular weight and weight ratio of each compound. The content of allyl acrylate in the reaction system was 90 mol % based on the content of 3-acryloxypropyltrichlorosilane.

A 20-ml screw cap test tube was thoroughly purged with nitrogen, filled with 10 g of the reaction mixture, and capped, after which it was heated at 100° C. for testing thermal stability. After 30 hours, the reaction mixture remained flowing, indicating no tendency to self-polymerization.

Example 8

Synthesis of 3-acryloxypropyltrichlorosilane

Reaction was performed as in Example 1 except that 0.1 g (corresponding to 0.1 wt % relative to allyl acrylate) of 3,4-dihydro-2,5,7,8-tetramethyl-2-(4,8,12-trimethyltridecyl)-2H-1-benzopyran-6-ol was used instead of 2,6-di-tert-butyl-4-methylphenol.

The reaction mixture was analyzed by gas chromatography, finding that allyl acrylate (starting reactant), trichlorosilane, and 3-acryloxypropyltrichlorosilane (product) were in a percent area ratio of 7:0:93. The area ratio of compounds was converted to a weight ratio, and the contents of compounds were computed based on the molecular weight and weight ratio of each compound. The content of allyl acrylate in the reaction system was 22 mol % based on the content of 3-acryloxypropyltrichlorosilane.

A 20-ml screw cap test tube was thoroughly purged with nitrogen, filled with 10 g of the reaction mixture, and capped, after which it was heated at 100° C. for testing thermal stability. After 30 hours, the reaction mixture remained flowing, indicating no tendency to self-polymerization.

Example 9

Synthesis of 3-acryloxypropyltrichlorosilane

Reaction was performed as in Example 1 except that 0.1 g (corresponding to 0.1 wt % relative to allyl acrylate) of 2,6-dimethyl-4-methoxyphenol was used instead of 2,6-di-tert-butyl-4-methylphenol.

The reaction mixture was analyzed by gas chromatography, finding that allyl acrylate (starting reactant), trichlorosilane, and 3-acryloxypropyltrichlorosilane (product) were in a percent area ratio of 9:0:91. The area ratio of compounds was converted to a weight ratio, and the contents of compounds were computed based on the molecular weight and weight ratio of each compound. The content of allyl acrylate in the reaction system was 22 mol % based on the content of 3-acryloxypropyltrichlorosilane.

A 20-ml screw cap test tube was thoroughly purged with nitrogen, filled with 10 g of the reaction mixture, and capped, after which it was heated at 100° C. for testing thermal stability. After 30 hours, the reaction mixture remained flowing, indicating no tendency to self-polymerization.

Example 10

Synthesis of 3-acryloxypropyltrichlorosilane

Reaction was performed as in Example 1 except that 0.1 g (corresponding to 0.1 wt % relative to allyl acrylate) of p-benzoquinone was used instead of 2,6-di-tert-butyl-4-methylphenol.

The reaction mixture was analyzed by gas chromatography, finding that allyl acrylate (starting reactant), trichlorosilane, and 3-acryloxypropyltrichlorosilane (product) were in a percent area ratio of 9:0:91. The area ratio of compounds was converted to a weight ratio, and the contents of compounds were computed based on the molecular weight and weight ratio of each compound. The content of allyl acrylate in the reaction system was 22 mol % based on the content of 3-acryloxypropyltrichlorosilane.

A 20-ml screw cap test tube was thoroughly purged with nitrogen, filled with 10 g of the reaction mixture, and capped, after which it was heated at 100° C. for testing thermal stability. After 30 hours, the reaction mixture remained flowing, indicating no tendency to self-polymerization.

Example 11

Synthesis of 3-acryloxypropyltrichlorosilane

Reaction was performed as in Example 1 except that 0.1 g (corresponding to 0.1 wt % relative to allyl acrylate) of phenothiazine was used instead of 2,6-di-tert-butyl-4-methylphenol.

The reaction mixture was analyzed by gas chromatography, finding that allyl acrylate (starting reactant), trichlorosilane, and 3-acryloxypropyltrichlorosilane (product) were in a percent area ratio of 8:0:92. The area ratio of compounds was converted to a weight ratio, and the contents of compounds were computed based on the molecular weight and weight ratio of each compound. The content of allyl acrylate in the reaction system was 22 mol % based on the content of 3-acryloxypropyltrichlorosilane.

A 20-ml screw cap test tube was thoroughly purged with nitrogen, filled with 10 g of the reaction mixture, and capped, after which it was heated at 100° C. for testing thermal stability. After 30 hours, the reaction mixture remained flowing, indicating no tendency to self-polymerization.

Example 12

Synthesis of 3-acryloxypropyltrichlorosilane

Reaction was performed as in Example 1 except that 0.1 g (corresponding to 0.1 wt % relative to allyl acrylate) of conjugated linoleic acid was used instead of 2,6-di-tert-butyl-4-methylphenol.

The reaction mixture was analyzed by gas chromatography, finding that allyl acrylate (starting reactant), trichlorosilane, and 3-acryloxypropyltrichlorosilane (product) were in a percent area ratio of 8:0:92. The area ratio of compounds was converted to a weight ratio, and the contents of compounds were computed based on the molecular weight and weight ratio of each compound. The content of allyl acrylate in the reaction system was 22 mol % based on the content of 3-acryloxypropyltrichlorosilane.

A 20-ml screw cap test tube was thoroughly purged with nitrogen, filled with 10 g of the reaction mixture, and capped, after which it was heated at 100° C. for testing thermal stability. After 30 hours, the reaction mixture remained flowing, indicating no tendency to self-polymerization.

Comparative Example 1

Synthesis of 3-acryloxypropyltrichlorosilane

Reaction was performed as in Example 1 except that 54.2 g (0.400 mole) of trichlorosilane and 112.1 g (1.000 mole) of allyl acrylate were used. In this example, trichlorosilane and allyl acrylate were fed in a molar ratio of 0.4:1, and the hourly feed rate of trichlorosilane was always constant and 40 mol % relative to allyl acrylate.

At a certain time in the step of continuously and simultaneously feeding trichlorosilane and allyl acrylate, the reaction mixture was analyzed by gas chromatography, finding that allyl acrylate (starting reactant), trichlorosilane, and 3-acryloxypropyltrichlorosilane (product) were in a percent area ratio of 34:0:66. The area ratio of compounds was converted to a weight ratio, and the contents of compounds were computed based on the molecular weight and weight ratio of each compound. The content of allyl acrylate in the reaction system was 114 mol % based on the content of 3-acryloxypropyltrichlorosilane. After some time from the restart of simultaneous feed, the reaction mixture ceased from flowing. The reaction mixture self-polymerized and solidified midway through the reaction.

Comparative Example 2

Synthesis of 3-acryloxypropyltrichlorosilane

Reaction was performed as in Example 1 except that 112.1 g (1.000 mole) of allyl acrylate was fed in advance, after which 135.5 g (1.000 mole) of trichlorosilane was continuously fed thereto. Midway through the trichlorosilane feeding, the reaction mixture ceased from flowing. The reaction mixture self-polymerized and solidified midway through the reaction.

Comparative Example 3

Synthesis of 3-acryloxypropyltrichlorosilane

Reaction was performed as in Example 1 except that 2,6-di-tert-butyl-4-methylphenol was omitted. Midway through the continuous and simultaneous feeding of trichlorosilane and allyl acrylate, the reaction mixture ceased from flowing. The reaction mixture self-polymerized and solidified midway through the reaction.

Example 13

Synthesis of 3-acryloxypropylmethyldichlorosilane

Reaction was performed as in Example 1 except that 114.0 g (1.000 mole) of methyldichlorosilane was used instead of trichlorosilane.

The reaction mixture was analyzed by gas chromatography, finding that allyl acrylate (starting reactant), methyldichlorosilane, and 3-acryloxypropylmethyldichlorosilane (product) were in a percent area ratio of 9:0:91. The area ratio of compounds was converted to a weight ratio, and the contents of compounds were computed based on the molecular weight and weight ratio of each compound. The content of allyl acrylate in the reaction system was 20 mol % based on the content of 3-acryloxypropylmethyldichlorosilane.

A 20-ml screw cap test tube was thoroughly purged with nitrogen, filled with 10 g of the reaction mixture, and capped, after which it was heated at 100° C. for testing thermal stability. After 30 hours, the reaction mixture remained flowing, indicating no tendency to self-polymerization.

Comparative Example 4

Synthesis of 3-acryloxypropylmethyldichlorosilane

Reaction was performed as in Example 13 except that 112.1 g (1.000 mole) of allyl acrylate was fed in advance, after which 114.0 g (1.000 mole) of methyldichlorosilane was continuously fed thereto. Midway through the methyldichlorosilane feeding, the reaction mixture ceased from flowing. The reaction mixture self-polymerized and solidified midway through the reaction.

Example 14

Synthesis of 3-methacryloxypropyltrichlorosilane

Reaction was performed as in Example 1 except that 126.2 g (1.000 mole) of allyl methacrylate was used instead of allyl acrylate.

The reaction mixture was analyzed by gas chromatography, finding that allyl methacrylate (starting reactant), trichlorosilane, and 3-methacryloxypropyltrichlorosilane (product) were in a percent area ratio of 3:0:97. The area ratio of compounds was converted to a weight ratio, and the contents of compounds were computed based on the molecular weight and weight ratio of each compound. The content of allyl methacrylate in the reaction system was 6 mol % based on the content of 3-methacryloxypropyltrichlorosilane.

A 20-ml screw cap test tube was thoroughly purged with nitrogen, filled with 10 g of the reaction mixture, and capped, after which it was heated at 100° C. for testing thermal stability. After 30 hours, the reaction mixture remained flowing, indicating no tendency to self-polymerization.

Comparative Example 5

Synthesis of 3-methacryloxypropyltrichlorosilane

Reaction was performed as in Example 14 except that 126.2 g (1.000 mole) of allyl methacrylate was fed in advance, after which 135.5 g (1.000 mole) of trichlorosilane was continuously fed thereto. Midway through the trichlorosilane feeding, the reaction mixture ceased from flowing. The reaction mixture self-polymerized and solidified midway through the reaction.

Example 15

Synthesis of 3-methacryloxypropylmethyldichlorosilane

Reaction was performed as in Example 14 except that 114.0 g (1.000 mole) of methyldichlorosilane was used instead of trichlorosilane.

The reaction mixture was analyzed by gas chromatography, finding that allyl methacrylate (starting reactant), methyldichlorosilane, and 3-methacryloxypropylmethyldichlorosilane (product) were in a percent area ratio of 4:0:96. The area ratio of compounds was converted to a weight ratio, and the contents of compounds were computed based on the molecular weight and weight ratio of each compound. The content of allyl methacrylate in the reaction system was 8 mol % based on the content of 3-methacryloxypropylmethyldichlorosilane.

A 20-ml screw cap test tube was thoroughly purged with nitrogen, filled with 10 g of the reaction mixture, and capped, after which it was heated at 100° C. for testing thermal stability. After 30 hours, the reaction mixture remained flowing, indicating no tendency to self-polymerization.

Comparative Example 6

Synthesis of 3-methacryloxypropylmethyldichlorosilane

Reaction was performed as in Example 15 except that 126.2 g (1.000 mole) of allyl methacrylate was fed in advance, after which 114.0 g (1.000 mole) of methyldichlorosilane was continuously fed thereto. Midway through the methyldichlorosilane feeding, the reaction mixture ceased from flowing. The reaction mixture self-polymerized and solidified midway through the reaction.

TABLE 1

|  |  | Reactant feed mode | Molar ratio of compounds (1):(2) | Polymerization inhibitor | Polymerized or not |
|---|---|---|---|---|---|
| Example | 1 | Simultaneous feed | 1:1 | 2,6-di-tert-butyl-4-methylphenol | stable (30 hr @100° C.) |
|  | 2 | Simultaneous feed | 1:1 | 2,6-di-tert-butyl-4-methylphenol | stable (30 hr @100° C.) |
|  | 3 | Simultaneous feed | 1:1 | 2,6-di-tert-butyl-4-methylphenol | stable (30 hr @100° C.) |
|  | 4 | Simultaneous feed | 1.1:1 | 2,6-di-tert-butyl-4-methylphenol | stable (30 hr @100° C.) |
|  | 5 | Simultaneous feed | 1.2:1 | 2,6-di-tert-butyl-4-methylphenol | stable (30 hr @100° C.) |
|  | 6 | Simultaneous feed | 0.8:1 | 2,6-di-tert-butyl-4-methylphenol | stable (30 hr @100° C.) |
|  | 7 | Simultaneous feed | 0.5:1 | 2,6-di-tert-butyl-4-methylphenol | stable (30 hr @100° C.) |
|  | 8 | Simultaneous feed | 1:1 | 3,4-dihydro-2,5,7,8-tetramethyl-2-(4,8,12-trimethyltridecyl)-2H-1-benzopyran-6-ol | stable (30 hr @100° C.) |
|  | 9 | Simultaneous feed | 1:1 | 2,6-dimethyl-4-methoxyphenol | stable (30 hr @100° C.) |
|  | 10 | Simultaneous feed | 1:1 | p-benzoquinone | stable (30 hr @100° C.) |
|  | 11 | Simultaneous feed | 1:1 | phenothiazine | stable (30 hr @100° C.) |
|  | 12 | Simultaneous feed | 1:1 | conjugated linoleic acid | stable (30 hr @100° C.) |
|  | 13 | Simultaneous feed | 1:1 | 2,6-di-tert-butyl-4-methylphenol | stable (30 hr @100° C.) |
|  | 14 | Simultaneous feed | 1:1 | 2,6-di-tert-butyl-4-methylphenol | stable (30 hr @100° C.) |
|  | 15 | Simultaneous feed | 1:1 | 2,6-di-tert-butyl-4-methylphenol | stable (30 hr @100° C.) |
| Comparative Example | 1 | Simultaneous feed | 0.4:1 | 2,6-di-tert-butyl-4-methylphenol | polymerized (midway reaction) |
|  | 2 | hydrohalosilane late feed | 1:1 | 2,6-di-tert-butyl-4-methylphenol | polymerized (midway reaction) |
|  | 3 | Simultaneous feed | 1:1 | nil | polymerized (midway reaction) |
|  | 4 | hydrohalosilane late feed | 1:1 | 2,6-di-tert-butyl-4-methylphenol | polymerized (midway reaction) |
|  | 5 | hydrohalosilane late feed | 1:1 | 2,6-di-tert-butyl-4-methylphenol | polymerized (midway reaction) |
|  | 6 | hydrohalosilane late feed | 1:1 | 2,6-di-tert-butyl-4-methylphenol | polymerized (midway reaction) |

As is evident from Table 1, the reactants, (meth)acrylate compound and hydrohalosilane compound must be simultaneously fed in the presence of a polymerization inhibitor for achieving quick reaction before an organosilicon compound having a (meth)acryloxy group can be produced in a stable manner without self-polymerization.

In Examples 1 to 15, the starting (meth)acrylate compound fed to the reaction system quickly reacts with the hydrohalosilane compound and converts to the product, organosilicon compound. This shortens the thermal history that the starting (meth)acrylate compound undergoes and at the same time, minimizes the content of the starting (meth)acrylate compound in the reaction system. As the thermal history is shortened, creation of radicals is suppressed so that the probability of initiation reaction is reduced. As the content of the reactant in the reaction system is minimized, the chance of contact with radicals is minimized so that the probability of propagation reaction is reduced.

By contrast, in Comparative Example 1 wherein the ratio of the starting (meth)acrylate compound to the hydrohalosilane compound is high, the proportion of the starting (meth)acrylate compound accumulating in the reaction system increases. As a result, the thermal history that the starting (meth)acrylate compound undergoes is prolonged, allowing self-polymerization to occur midway through the reaction.

In Comparative Examples 2, 4 to 6 wherein the starting (meth)acrylate compound is admitted in advance and only the hydrohalosilane compound is fed to the reaction system, the thermal history that the starting (meth)acrylate compound undergoes is prolonged, allowing self-polymerization to occur midway through the reaction.

In Comparative Example 3, although the thermal history that the starting (meth)acrylate compound undergoes is shortened by simultaneous dropwise feed, the product, organosilicon compound undergoes a certain extent of thermal history. Since the polymerization inhibitor is omitted, self-polymerization occurs midway through the reaction.

Japanese Patent Application No. 2019-202090 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing an organosilicon compound having a (meth)acryloyloxy group, comprising the steps of simultaneously feeding a hydrohalosilane compound and a (meth)acrylate compound having an alkenyl group in the presence of a polymerization inhibitor to a reaction system, and effecting hydrosilylation reaction in the presence of a platinum catalyst to form the organosilicon compound having a (meth)acryloyloxy group, the hydrohalosilane compound having the general formula (1):

$$HSiX_nR^1{}_{3-n}, \quad (1)$$

wherein $R^1$ is a substituted or unsubstituted $C_1$-$C_{10}$ monovalent hydrocarbon group, X is a halogen atom, and n is an integer of 2 or 3, the (meth)acrylate compound having the general formula (2):

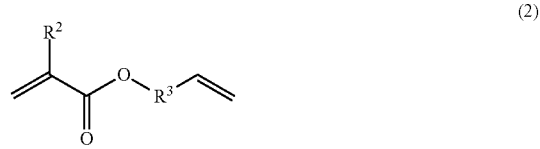

wherein $R^2$ is hydrogen or methyl and $R^3$ is an unsubstituted $C_1$-$C_{18}$ alkylene group, the organosilicon compound having the general formula (3):

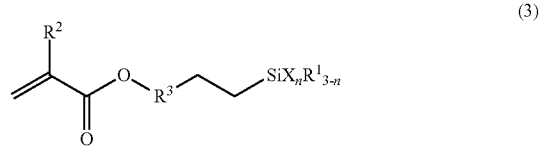

wherein $R^1$, $R^2$, $R^3$, X, and n are as defined above, the reaction being effected under such conditions that the content of the (meth)acrylate compound having formula (2) accounts for 0 to 100 mol % based on the content of the organosilicon compound having formula (3) in the reaction system.

2. The method of claim 1 wherein the hourly feed rate of the hydrohalosilane compound having formula (1) is 50 to 200 mol % based on the hourly feed rate of the (meth)acrylate compound having formula (2).

* * * * *